Nov. 16, 1971  A. W. NELSON  3,619,859
EXTRUSION APPARATUS
Filed Dec. 1, 1969  3 Sheets-Sheet 1
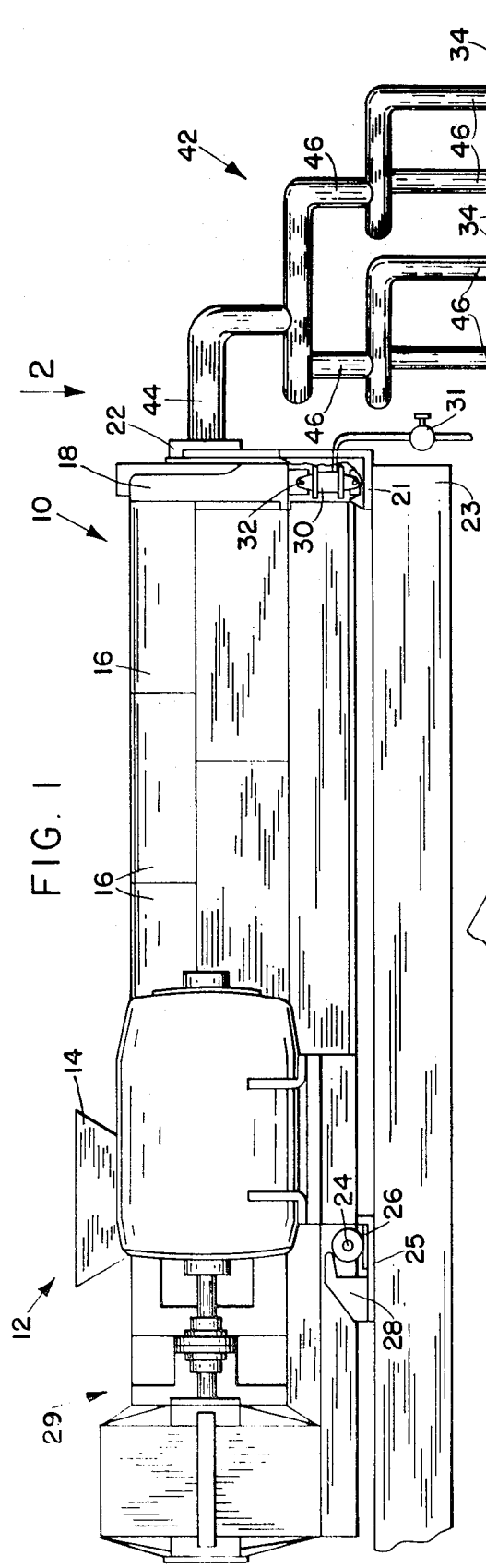
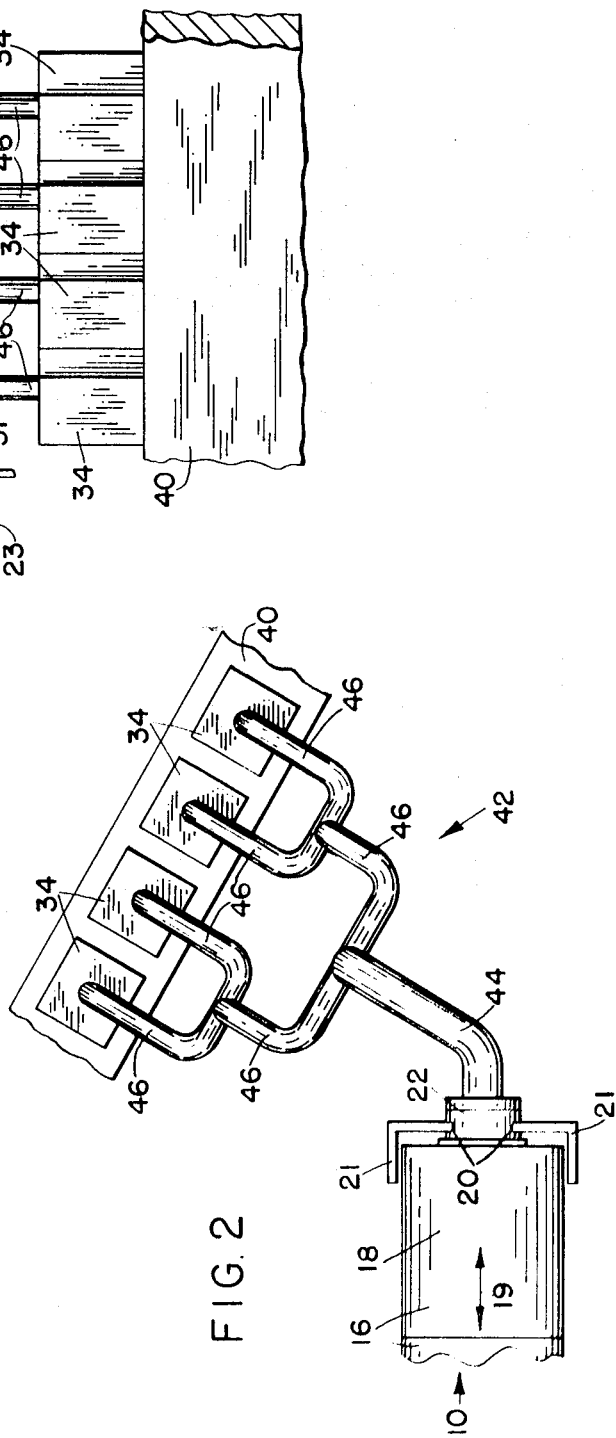
INVENTOR
ALDEN W. NELSON
BY *Howard H. Harner Jr.*
ATTORNEY

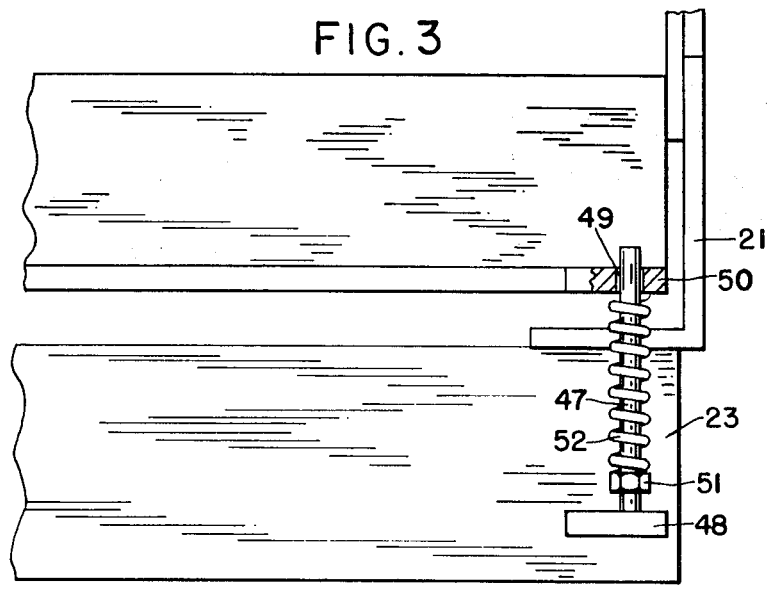
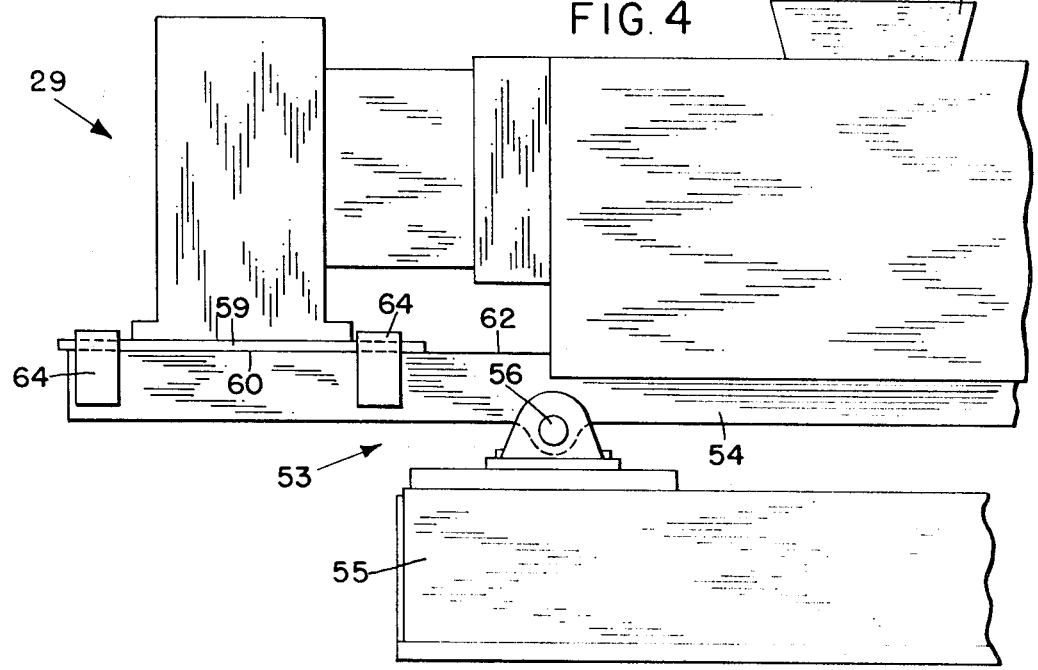
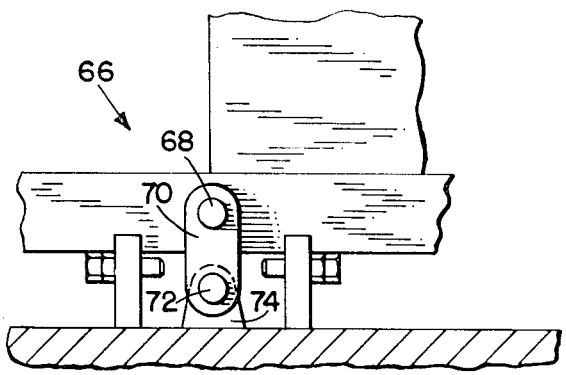
INVENTOR
ALDEN W. NELSON
BY Howard H. Garvey
ATTORNEY Nov. 16, 1971    A. W. NELSON    3,619,859
EXTRUSION APPARATUS
Filed Dec. 1, 1969    3 Sheets-Sheet 3
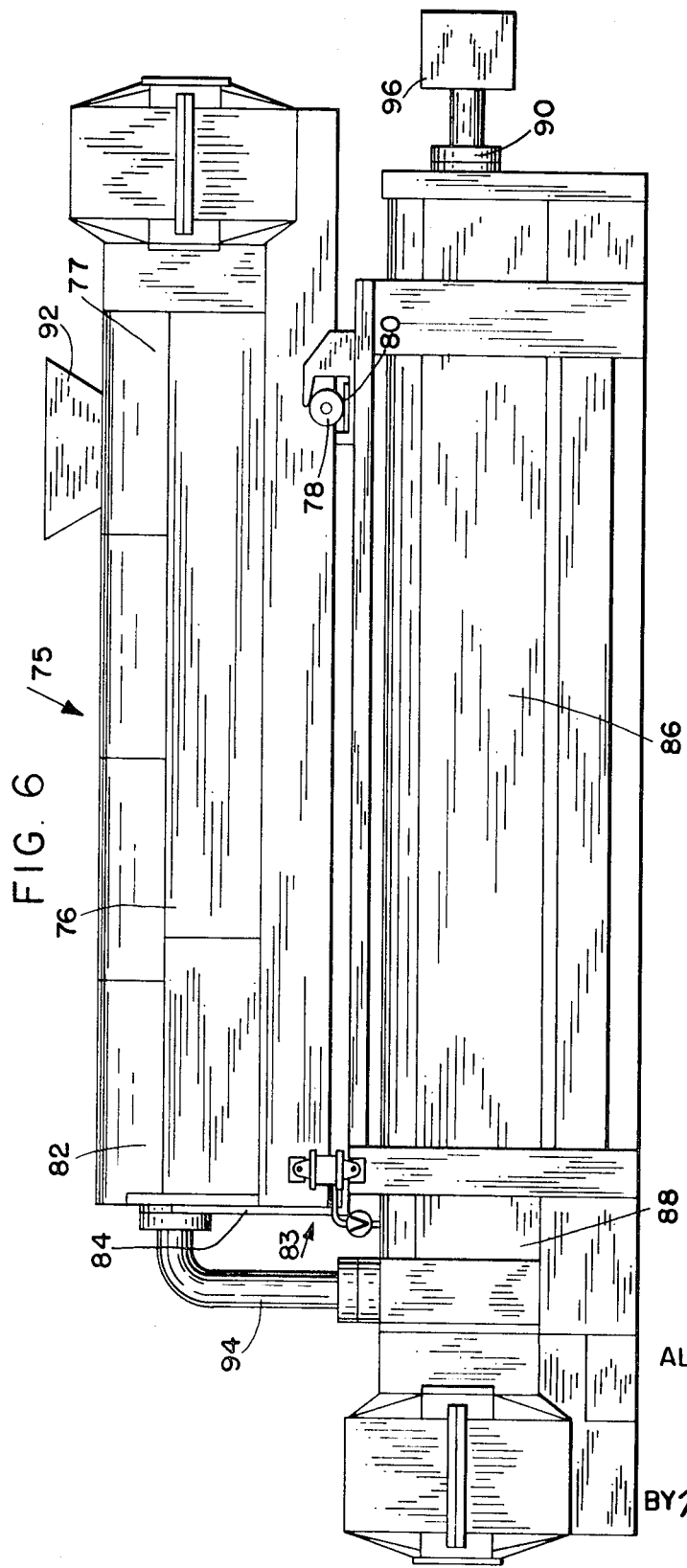
INVENTOR
ALDEN W. NELSON
BY *Howard H. Harvey*
ATTORNEY

United States Patent Office 3,619,859
Patented Nov. 16, 1971

3,619,859
EXTRUSION APPARATUS
Alden W. Nelson, West Mystic, Conn., assignor to Crompton & Knowles Corporation, Worcester, Mass.
Filed Dec. 1, 1969, Ser. No. 881,037
Int. Cl. B29f 3/00
U.S. Cl. 18—12 R                    10 Claims

ABSTRACT OF THE DISCLOSURE

An extrusion apparatus wherein one or more extrusion dies are located at a vertical distance from a generally horizontally elongated extruder having an entrance end and an exit end connected to the die by a manifold pipe system. The extruder is pivotally supported and balanced so that thermal expansion of the manifold pipes will lift the exit end of the extruder barrel with a minimum of stress on the pipes. Means are also provided to allow for horizontal thermal expansion of the extruder along its length from its exit end and means such as an air cylinder or spring are provided for supporting the unbalanced moment of the extruder where the extruder is slightly unbalanced.

BACKGROUND OF THE INVENTION

This invention relates to apparatus for plasticizing and feeding plastic material to one or more dies located below or above the plasticizing apparatus which is usually in the form of an extruder.

The invention particularly relates to means for accommodating thermal expansion of the extruder and the connecting conduits between the extruder and the dies.

Thermal expansion is a well-known problem, particularly with large machinery where high temperatures are involved. This problem is particularly acute in machinery where there are connections to allow for fluid flow such as in plastic extrusion machinery. Expansion of some of the longer parts, such as the barrel of the extruder, creates stress on the connections and causes them to break or to become misaligned and cause leakage. It is known that in the steel industry an elongated drum in regenerative heat exchanges is supported at one end by rollers to allow for thermal expansion of the drum.

In certain plastic extrusion system, dies are located below or above the extruder barrel to save floor space and are connected to the exit end of the barrel by a manifold pipe system. With this type of system, not only does the expansion of the extruder barrel have to be accommodated but also the expansion of the manifold pipes in a vertical plane. The dies are rigidly mounted and the extruder barrel is very heavy so that the pressure on the manifold pipes, due to expansion, causes damaging stresse on pipes and creates leakages. In many instances, multiple die units are used where, on occasion, one or more of the units has to be removed for cleaning, repairing, or being replaced by a different die. It is not practical to shut down the entire operation for die removal, but the pressures on the manifold and die connections due to thermal expansion prevent their removal.

SUMMARY OF THE INVENTION

It is a principal object of the invention to provide apparatus which will permit expansion of the manifold pipes without creating damaging stresses on any of the connections between the extruder and dies.

It is another object of the invention to allow for thermal expansion of the extruder barrel while allowing expansion of manifold pipes.

A further object of the invention is the provision of adjustable compensator means for variations in weight distribution in extruders.

These objects are accomplished by pivotally mounting the extruder near its center of gravity so that it is balanced, allowing the exit end to be moved vertically by extremely small forces. The pivoting means may be rollers mounted on the extruder for rolling on a supporting surface or at least one link pivoted at one end to a fixed support and pivoted at its other end to the bottom of the extruder. Either means will allow for longitudinal thermal expansion of the extruder barrel.

By placing the pivoting means just beneath the center of gravity, the extruder will be substantially balanced. However, because of the extreme weight of the extruder and the odd configurations of the various components thereof, it is very difficult to locate the pivoting means so that the extruder will be exactly balanced. In addition, there are many factors which will change the weight distribution after the extruder is assembled. These factors include various accessories such as material screens at the exit end and variations in the feed screws which may be replaced within the extruder barrel. In the event that there is more weight on one side of the pivot; a moment will be developed which will cause the extruder to tilt around its pivot. Resilient compensating means are therefore provided to resist this unbalanced moment and relieve the resulting load on the manifold connections. The compensating means can be made adjustable so that there will be no load on the manifold pipes. Two types of compensating means which have been found to be effective are springs and air cylinders. The compensating means may be placed on top or under the extruder at either end between a fixed support and the extruder. Whether the compensator is the type which pushes or pulls will be determined by the manner in which the extruder is unbalanced and where it is located with respect to the extruder. Since it is so difficult to predict exactly how the extruder will be unbalanced, it has been found that it is better to plan the location of the pivoting means so that the front end of the extruder will be slightly heavier. In this way, a push type of cylinder or compression spring can be placed beneath the exit end of the extruder and will be positioned near the manifold pipes. This is thought to be the preferred location and condition of the compensating means. The front end of the extruder can be made heavier to the extent that it will remain heavier in spite of anticipated changes in accessories. In this way, the compensator will always stay in the same place and changes in moment due to different weight distribution can be taken care of by adjusting the compensating means. Since the extruder is substantially balanced and whatever unbalanced moment there is will be compensated for, expansion of the manifold pipes will cause the exit end of the extruder to be lifted around the pivoting means with a minimum of stress on the pipes.

Since the exit end of the extruder is supported by the yieldable compensating means, there is no danger of damage to the manifold pipes or misalignment of the joints to cause leakage. When several die units are employed, one or more of the dies could easily be removed.

Another application of the invention is a dual extruder arrangement where a first extruder barrel is located above and feeds a second extruder through a manifold pipe. The second extruder is connected directly to one or more dies and the first extruder is supported in the same manner as in the first described embodiment.

Other objects and advantages of the invention will become more apparent when the following detailed description is read in conjunction with the drawings in which:

FIG. 1 is a side elevation of a plastic extrusion apparatus adapted for feeding directly to die units and embodying the preferred embodiment of the present invention;

FIG. 2 is a plan view of the apparatus shown in FIG. 1;

FIG. 3 is a fragmentary side elevation showing a modified compensating means;

FIG. 4 is a fragmentary view showing a modified support means for the entrance end of the extruder barrel;

FIG. 5 is a fragmentary view showing a second modified support means for the entrance end of the extruder barrel; and FIG. 6 is a view similar to FIG. 1 and showing a modification wherein a first extruder is located above and feeds material to a second extruder.

Referring to FIGS. 1 and 2, there is shown the usual extruder generally indicated at 10. The entrance end of the extruder, indicated at 12, has a feed hopper 14 through which material to be plasticized is fed. Material is fed along the length of the barrel by an extruder screw, not shown but well known in the art, and heated to a plasticized state by heating jackets 16 mounted along the barrel. The plasticized material is forced through an outlet opening at the end of the exit end 18 of the extruder.

The exit end of the extruder is anchored against movement in the direction of arrows 19 (see FIG. 2) by brackets 21 which are engaged in milled slots 20—20 located on each side of a flange 22 at the exit end of the barrel 10. Flanges 21 are mounted on an extruder supporting base 23.

The entrance end 12 of the extruder is supported on two or more rollers 24 on either side. Roll supporting brackets 25 mounted on base 23 has a hardened surface 26 for supporting rollers 24. Bracket 25 has an upwardly extending projection 28 which is adjustably spaced from the normal position of roll 24 by a distance which is equal to the expansion of the barrel. Since the barrel is held against forward motion by brackets 21, all of the expansion of the barrel will be toward the projection 28 until the projection is engaged by roller 24 which firms up the barrel and prevents vibration.

Rollers 24 are located near the center of gravity of the extruder so that the extruder is substantially balanced. The extruder appears to be unbalanced in FIG. 1 but the gear reducer assembly generally indicated at 29 is extremely heavy and accounts for most of the weight of the extruder.

The unbalanced load of the extruder is supported at the exit end 18 by an adjustable air cylinder assembly 30. The cylinder itself is pivotally supported by the base of bracket 21 and the piston 32, which is slidable within the cylinder, is pivotally attached to the lower end of the barrel. The air pressure in the cylinder is adjustable so that the unbalanced weight or moment at the exit end of the extruder will be compensated for by the cylinder assembly 30. The air pressure is kept constant by an adjustable bleeding type regulator valve 31.

A series of die units 34 are located at a point below the extrusion barrel. The units may be of any type and for a variety of purposes such as spinnerette dies for synthetic fibers. The dies are supported by fixed supporting means 40.

The plastic material to be extruded is conveyed from the barrel 10 to the die units 34 through a manifold pipe system indicated generally at 42. This system includes a main pipe 44 which is connected to the exit end of the extrusion barrel and secondary pipes 46 connecting the main pipe to the die units.

During operation of the extrusion apparatus, the manifold pipes become very hot from the plastic material and, consequently, expand. The greater the vertical length of pipes, the greater will be the total expansion of the manifold pipe system. Since the dies 34 are prevented from moving downwardly, all of the expansion of the manifold pipes will be in an upward direction, and the exit end of the extruder barrel will be lifted by the expanding manifold pipes. Only a fraction of the weight of the barrel is impressed upon the pipes, since the air cylinder 30 supports the unbalanced load at the exit end of the barrel. There is a very small amount of pressure on the manifold pipes so that leakage is prevented and removal of one or more of the die units is facilitated. There is enough clearance in the slots 20 to allow the brackets 21 to slide in the slots despite the angularity of upward motion of the exit end of the barrel.

A modification of the invention is illustrated in FIG. 3 wherein the barrel is supported by one or more compression springs 52. It is preferable that a pair of springs 52 be used, one on each side of the extruder, for better stability. Each spring is mounted on a rod 47 which is fixed at its lower end to a bracket 48 on supporting base 23 and extends freely through a hole 49 in a bracket 50 extending from the base of the extruder. Spring 52 bears against the underside of bracket 48 and an adjusting nut 51. The lower end of rod 47 is threaded so that the nut 51 can be moved up or down to increase or decrease the pressure of the spring 52.

FIG. 4 illustrates a modified supporting means (generally indicated at 53) for supporting the entrance end of the extruder. The supporting means 53 includes an extruder supporting base 54 which is pivotally mounted at 56 on a main supporting base 55. The entrance end of the extruder barrel is mounted in an entrance end holding member such as gear reducer assembly 29 which has a flat bottom plate 59. This plate has a finished bottom surface 60 adapted to slide on the upper finished surface 62 of extruder supporting base 54. Guide brackets 64 are mounted on both sides of the base 54 and overhang the side edges of plate 59 in a guiding relationship. When the extruder barrel expands longitudinally, surface 60 will slide along surface 62. The exit end of the extruder barrel is rigidly supported by the base 54 which is in turn supported by a yieldable means such as the adjustable air cylinder 30, as shown in FIG. 1. Thermal expansion of the manifold pipes will cause the base 54 to pivot at 56 on base 55 to achieve the same results as the arrangement shown in FIG. 1.

FIG. 5 shows another support means (indicated generally at 66) for supporting the entrance end of the extruder barrel. Support means 66 includes a cross shaft 68 on which the entrance end of the extruder barrel is pivotally mounted. Both ends of shaft 68 are pivotally supported outside of the barrel by links 70 which are themselves pivoted at 72 to a fixed structure 74. When the extruder barrel expands, links 70 will rock in a counterclockwise direction (as shown in FIG. 5) around pivot 72. Expansion of the manifold pipes will cause the exit end of the extruder to pivot around shaft 68.

Referring to FIG. 6, the invention is shown applied to a two-stage extrusion apparatus generally indicated at 75. The first stage includes a first extruder 76 which is pivotally balanced on a roller 78 which is free to roll on a roll support bracket 80 which is similar to bracket 25 in FIG. 1. The exit end 82 of the extruder 76 is mounted in bracket 84 which anchors the barrel in the same manner as brackets 21 in FIG. 1. The unbalanced moment of the extruder is opposed by resilient compensating means generally indicated at 83 which could be like air cylinder assembly 30.

The second stage of apparatus 75 includes a second extruder 86 having an entrance end 88 and an exit end 90. The material to be extruded is fed into a hopper 92 at the entrance end 77 of the first extruder 76 and is heated and fed to the exit end 82 by a feed screw to complete a first mixing stage. The extruding material is forced from the exit end 82 of extruder 76 to the entrance end 88 of extruder 86 through a manifold pipe 94. The extruding material is then moved from end 88 to end 90 of extruder 86 by a second feed screw within the barrel to complete a second mixing stage. The material is finally forced through a die head 96 as an extruded product.

Having now particularly described the invention, what is now claimed is:

1. An extrusion apparatus comprising:
   (a) an extruder including an extruder barrel which has an entrance end and an exit end, the longitudinal axis of said barrel being substantially horizontally disposed;
   (b) an extruder supporting base having a substantially horizontal surface;
   (c) means pivotally connected to said extruder resting on said base for relative movement therealong in the direction of the longitudinal axis of said barrel;
   (d) restraining means for preventing said exit end of said extruder barrel from moving in a horizontal direction;
   (e) means for heating said barrel;
   (f) means for feeding plasticizable material from said entrance end of said barrel to said exit end for extrusion therefrom;
   (g) means located at a vertical distance from the exit end of said extruder barrel for processing material extruded from said exit end;
   (h) supporting means for said processing means; and
   (i) manifold means connecting said processing means and the exit end of said barrel for conveying plasticized material from said exit end to said processing means.

2. The extrusion apparatus as described in claim 1 wherein said processing means comprises:
   (a) at least one extrusion die; and
   (b) a second extruder for conveying plasticized material from said manifold means to said extrusion die.

3. The extrusion apparatus as described in claim 1 wherein said extruder barrel has a slot in each side of said barrel adjacent said exit end and said restraining means includes a fixed vertical guide member disposed in said slot for allowing said exit end to be moved vertically.

4. The extrusion apparatus as described in claim 1 wherein means are provided for yieldingly compensating for an unbalanced moment of the extruder around said supporting pivot.

5. The extrusion appartus as described in claim 4 wherein said compensating means comprises:
   (a) a fixed support; and
   (b) pneumatic means interposed between said fixed support and said extruder at a point on said extruder for opposing said unbalanced moment.

6. The extrusion apparatus as described in claim 1 wherein the means pivotally connected to said extruder has a flat surface resting on said base for sliding relative movement therealong.

7. The extrusion apparatus as described in claim 5 wherein said pneumatic means comprises:
   (a) an air cylinder pivotally connected to said fixed support;
   (b) a piston slidable within said cylinder and pivotally connected to said extruder; and
   (c) means to adjust the air pressure to said cylinder.

8. The extrusion apparatus as described in claim 4 wherein said compensating means comprises:
   (a) a fixed support; and
   (b) at least one spring interposed between said fixed support and said extruder at a point on said extruder for opposing said unbalanced moment.

9. The extrusion apparatus as described in claim 1 wherein said means pivotally connected to said extruder is also pivotally connected to said base.

10. The extrusion apparatus as described in claim 1 wherein said means pivotally connected to said extruder comprise roller means resting on said base for a relative rolling movement therealong.

References Cited

UNITED STATES PATENTS

| | | | |
|---|---|---|---|
| 3,516,118 | 6/1970 | Gallay | 18—30 JA UX |
| 3,162,900 | 12/1964 | Huelskamp | 18—30 JA |
| 3,321,008 | 5/1967 | Jones | 164—280 X |
| 3,335,464 | 8/1967 | Schwartz | 18—30 JA |
| 3,425,095 | 2/1969 | Kotek | 18—30 JA UX |
| 3,464,091 | 9/1969 | Bielfeldt | 18—30 JA UX |

J. SPENCER OVERHOLSER, Primary Examiner

M. O. SUTTON, Assistant Examiner